(12) United States Patent
Hayashi et al.

(10) Patent No.: US 6,847,475 B2
(45) Date of Patent: Jan. 25, 2005

(54) OPTICAL SIGNAL PROCESSOR AND METHOD THEREOF

(75) Inventors: Michiaki Hayashi, Saitama (JP); Hideaki Tanaka, Saitama (JP)

(73) Assignee: KDDI Corporation, Tokyo (JP)

(*) Notice: Subject to any disclaimer, the term of this patent is extended or adjusted under 35 U.S.C. 154(b) by 0 days.

(21) Appl. No.: 10/727,971

(22) Filed: Dec. 3, 2003

(65) Prior Publication Data

US 2004/0190101 A1 Sep. 30, 2004

(30) Foreign Application Priority Data

Mar. 27, 2003 (JP) ........................................ 2003-088851

(51) Int. Cl.[7] ................................................ G02F 1/01
(52) U.S. Cl. .................................... 359/238; 359/276
(58) Field of Search ................................ 359/238, 248, 359/276, 333, 583, 618; 398/140, 141, 157, 178

(56) References Cited

U.S. PATENT DOCUMENTS

| 5,946,129 A | 8/1999 | Xu et al. |
|---|---|---|
| 5,959,764 A | 9/1999 | Edagawa et al. |
| 6,046,841 A | 4/2000 | Mehgerefteh et al. |
| 6,256,137 B1 | 7/2001 | Hironishi |
| 6,259,552 B1 | 7/2001 | Boffi et al. |
| 6,294,821 B1 | 9/2001 | Chandrasekhar |
| 6,349,106 B1 | 2/2002 | Coldren |
| 6,437,905 B1 | 8/2002 | Joyner et al. |
| 6,728,019 B2 * | 4/2004 | Usami et al. ............... 359/248 |

* cited by examiner

*Primary Examiner*—Hung Xuan Dang
*Assistant Examiner*—Tuyen Tra
(74) *Attorney, Agent, or Firm*—Christie, Parker and Hale, LLP

(57) ABSTRACT

An optical signal processor comprises a first input terminal for a pulse signal light with a signal wavelength, a second input terminal for a probe light with, probe wavelength different from the signal wavelength, a first splitter to split the probe light into two portions, an XPM optical device to modulate the one portion of the split output lights from the splitter, a second splitter to split light with the probe wavelength phase-modulated by the XPM optical device into two portions, a first combiner to combine the other portion of the split output lights from the first splitter with the one portion of the split output lights from the second splitter, and a second combiner to combine the other portion of the split output lights from the second splitter with the output light from the first combiner.

13 Claims, 4 Drawing Sheets

OPTICAL SIGNAL PROCESSOR AND METHOD THEREOF

CROSS REFERENCE TO RELATED APPLICATIONS

This application claims priority to Japanese Patent Application No. 2003-088851, filed Mar. 27, 2003, the entire contents of which are incorporated herein by reference.

FIELD OF THE INVENTION

This invention generally relates to an optical signal processor and a method thereof, and more specifically, relates to an optical signal processor and a method thereof for using cross phase modulation (XPM) of a semiconductor optical amplifier.

BACKGROUND OF THE INVENTION

Cross phase modulation (XPM) for modulating a refractive index and cross gain modulation (XGM) for modulating gain (or an absorption) have realized an optical device to control an optical signal with another light. A semiconductor optical amplifier is well known as an optical element used for the XPM or XGM.

For instance, by inputting a signal light to carry data and a CW light into an XPM or XGM optical element together, the CW light can be modulated by the signal light. This operation is used for changing optical carriers to carry data, namely used for wavelength conversion. Furthermore, by using one of the lights as a control light, an optical switch or an optical gate can be realized.

Wavelength converters using an SOA are described in the following patents:

U.S. Pat. No. 6,437,905;
U.S. Pat. No. 6,256,137;
U.S. Pat. No. 6,349,106;
U.S. Pat. No. 6,294,821;
U.S. Pat. No. 6,259,552;
U.S. Pat. No. 5,946,129;
U.S. Pat. No. 6,046,841; and
U.S. Pat. No. 5,959,764.

In the U.S. Pat. No. 5,959,764, a wavelength converter is described that utilizes mutual absorption saturation characteristics of an electroabsorption optical modulator.

FIG. 3 illustrates a schematic block diagram of a conventional wavelength converter using an SOA. FIG. 4 illustrates waveform examples of respective parts of the converter.

A pulse signal light 50 with a signal wavelength $\lambda s$ for carrying data enters a combiner 52. A waveform 70 in FIG. 4 shows a waveform example of the input pulse signal light 50. In the following explanation, a period in which an optical pulse exists in the pulse signal light 50 and its corresponding period are called as a pulse period and a period in which no optical pulse exists and its corresponding period are called as a non-pulse period.

A continuous wave (CW) light (probe light) 54 with a probe wavelength $\lambda p$ different from the signal wavelength $\lambda s$ enters a splitter 56. The splitter 56 splits the CW probe light 54 into two portions to apply one portion to the combiner 52 and the other to a phase adjuster 58.

The combiner 52 combines the input pulse signal light 50 and the one portion of the CW probe light 54 from the splitter 56 and applies the combined light to a semiconductor optical amplifier (SOA) 60. The SOA 60 modulates optical phase of the CW probe light 54 using the XPM according to amplitude variation of the pulse signal light 50. Here, assuming that the bias of the SOA 60 is set so that the optical phase of the CW probe light 54 differs by $\pi$ between the pulse period and the non-pulse period of the pulse signal light 50.

An optical bandpass filter 62 passes through only the component of probe wavelength $\lambda p$ out of the output light from the SOA 60. A waveform 72 in FIG. 4 illustrates amplitude variation and phase variation of the output light (with the probe wavelength $\lambda p$) from the optical bandpass filter 62. The SOA 60 also has an XGM effect and accordingly varies the amplitude of the CW probe light 54 according to the amplitude variation of the input pulse signal light 50. This variation becomes AM noise in the CW probe light 54. In particular, large AM noise is superposed in the center of the pulse period. This is because the gain of the SOA 60 for the wavelength $\lambda p$ decreases during the pulse period of the pulse signal light 50. Although omitted in FIG. 4, a pattern effect dependent on a data pattern of the pulse signal light 50 having entered the SOA 60 also causes the superposition of the AM noise on the CW probe light 54. Under an ideal condition that no XGM nor pattern effect exists, the amplitude of the output light from the optical bandpass filter 62 flattens and only the optical phase of the output light varies according to the amplitude variation of the pulse signal light 50.

The phase adjuster 58 adjusts the optical phase of the CW probe light 54 from the splitter 56 so that the optical phase shifts relatively by 1 from optical phase of a mark part of the output from optical bandpass filter 62.

A combiner 64 combines the output light from the optical bandpass filter 62 with the CW probe light which optical phase was adjusted by the phase adjuster 58. A waveform 74 in FIG. 4 illustrates a waveform of an output light 66 from the combiner 64. The output light 66 from the combiner 64 is a wavelength-converted signal light in which the wavelength $\lambda s$ of the input pulse signal light 50 was converted into the probe wavelength $\lambda p$.

In the conventional configuration, as illustrated in the waveform 74 in FIG. 4, the AM noise generated through the XGM in the SOA 60 is superposed on the wavelength-converted signal light (the output light 66 from the combiner 64). Furthermore, AM noise of a longer cycle generated through the pattern effect from the data pattern of the input pulse signal light 50 is also superposed on the output light 66 from the combiner 64. Such AM noise greatly deteriorates the transmission characteristics and accordingly makes the data transmission unstable.

This type of problem generally occurs not only in a wavelength converter but also in an optical device in which interaction from the XPM of two signal lights having a different wavelength is utilized and in which AM noise caused by the XGM and/or pattern effect is superposed.

SUMMARY OF THE INVENTION

An optical signal processor according to the present invention comprises a first input terminal for a pulse signal light with a signal wavelength, a second input terminal for a probe light with a probe wavelength different from the signal wavelength, a first splitter to split the probe light into two portions, an XPM optical device, to which one portion of the output lights from the first splitter and the pulse signal light enter, to modulate optical phase of the one portion of the output lights from the splitter according to amplitude variation of the pulse signal light, a second splitter to split the light with wavelength phase-modulated by the XPM optical device into two portions, a first combiner to combine the other portion of the split output lights from the first splitter with the one portion of the split output lights from the second splitter in in-phase relation during a period corresponding to a non-pulse period of the pulse signal light, and a second combiner to combine the other portion of the output lights from the second splitter with the output light from the first combiner in in-phase relation during a period corresponding to a pulse period of the pulse signal light.

An optical signal processing method according to the invention comprises steps of inputting a pulse signal light with a signal wavelength, inputting a probe light with a probe wavelength different from the signal wavelength, splitting the probe light into two portions to generate first and second probe light components, modulating optical phase of the first probe light component by an XPM device according to amplitude variation of the pulse signal light, splitting the phase-modulated first probe light component into two portions to generate first and second PM modulated lights, combining the first PM modulated light with the second probe light component at practically equivalent amplitude in in-phase relation during a period corresponding to a non-pulse period of the pulse signal light, and combining the second PM modulated light with the combined lights of the first PM modulated light and the second probe light component in in-phase relation during a period corresponding to a pulse period of the pulse signal light.

Preferably, the probe light comprises a continuous wave light.

BRIEF DESCRIPTION OF THE DRAWINGS

The above and other objects, features and advantages of the present invention will be apparent from the following detailed description of explanatory embodiments of the invention in conjunction with the accompanying drawings, in which.

DETAILED DESCRIPTION

Explanatory embodiments of the invention are explained below in detail with reference to the drawings.

Figure 1:
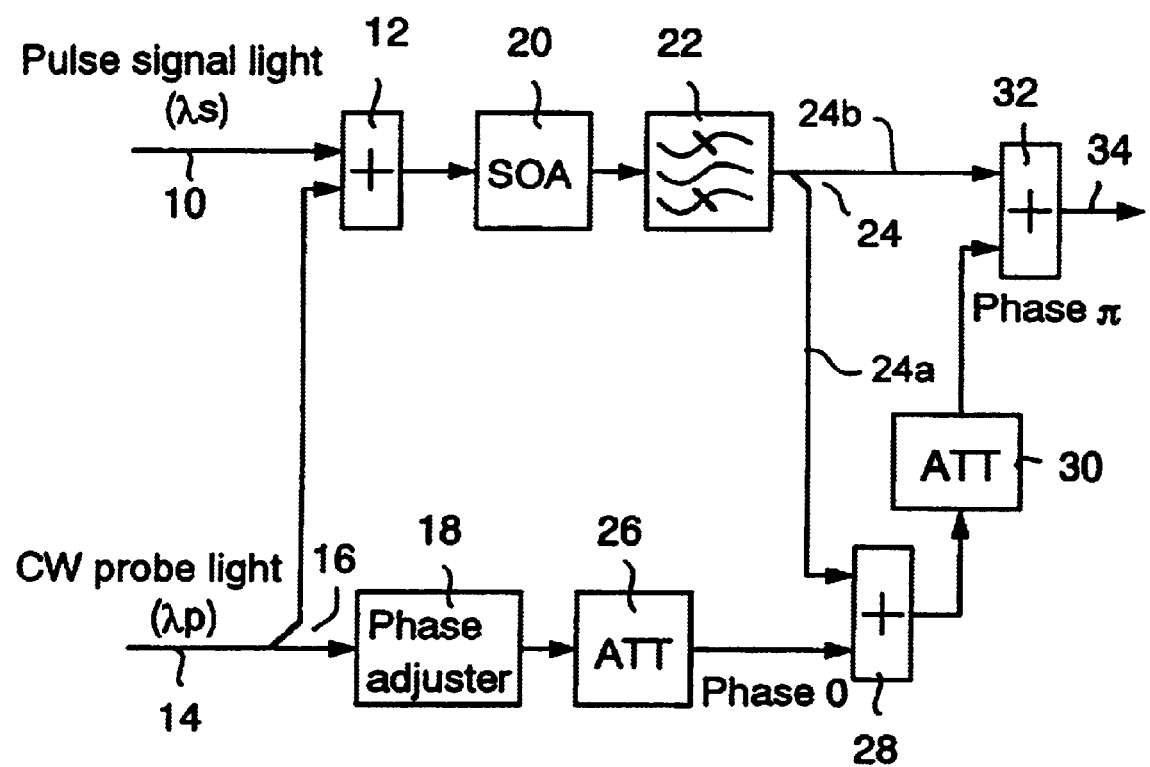
FIG. 1 is a schematic block diagram of an explanatory embodiment according to the invention.
Figure 2:
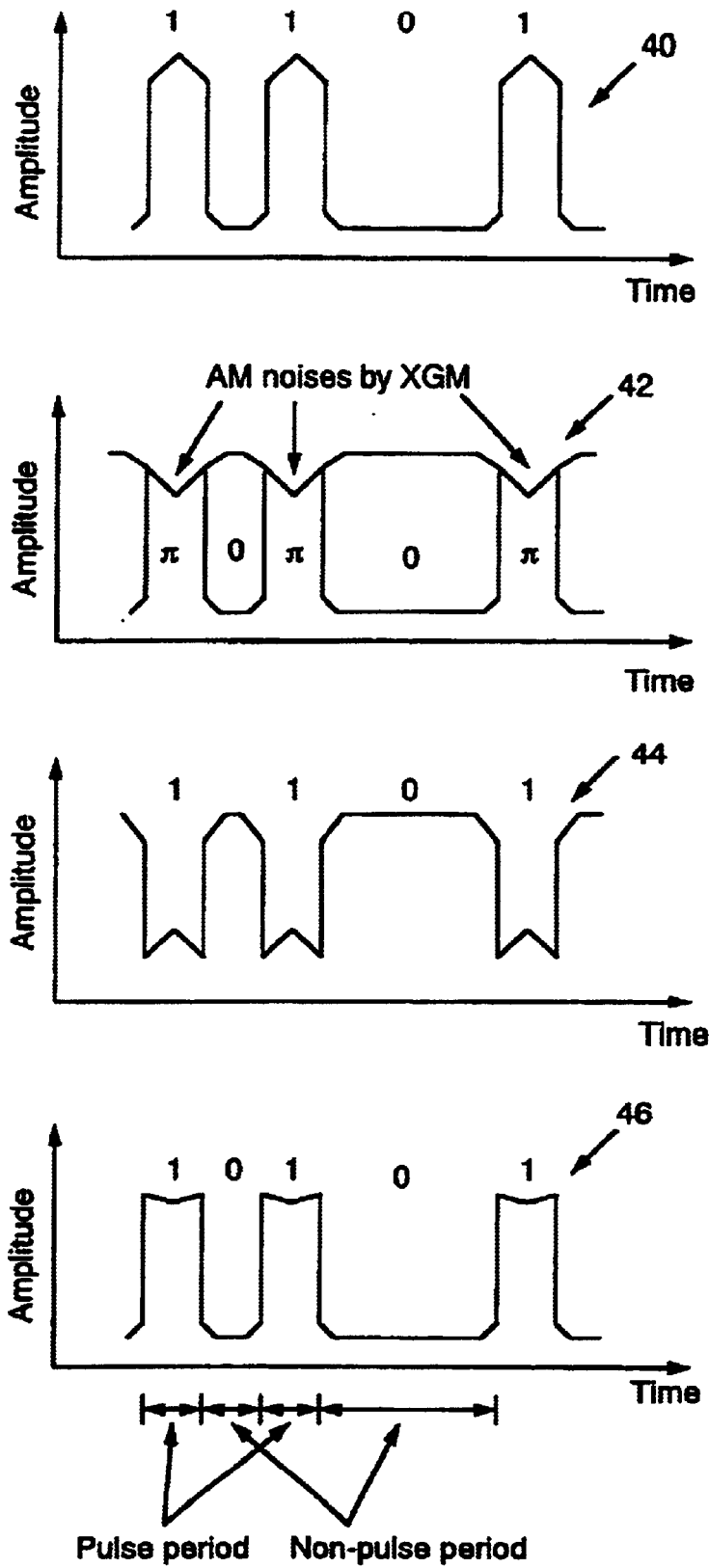
FIG. 2 shows waveform examples of the embodiment shown in FIG. 1.

FIG. 1 shows a schematic block diagram of an explanatory embodiment according to the invention. FIG. 2 shows waveform examples of respective parts of the embodiment. In FIG. 2, to make it easily understandable of the timing relation between respective waveforms 40–46, delays caused by each device in this embodiment are ignored.

A pulse signal light 10 with a signal wavelength λs for carrying data enters a combiner 12. A waveform 40 in FIG. 2 shows a waveform example of the input pulse signal light 10. In the following description, a period in which an optical pulse exists in the pulse signal light 10 and its corresponding period are called as a "pulse period" and a period in which no optical pulse exists and its corresponding period are called as a "non-pulse period."

A continuous wave (CW) light (probe light) 14 with a probe wavelength λp different from the signal wavelength λs enters a splitter 16. The splitter 16 splits the CW probe light 14 into two equal portions to apply one portion to the combiner 12 and the other to a combiner 28 through a phase adjuster 18 and an attenuator 26.

The combiner 12 combines the input pulse signal light 10 with the CW probe light 14 from the splitter 16 and applies the combined light to a semiconductor optical amplifier (SOA) 20. The SOA 20 modulates optical phase of the CW probe light 14 using the XPM according to amplitude variation of the pulse signal light 10. Here, assuming that a bias of the SOA 20 is set so that the optical phase of the CW probe light 14 differs by π between the pulse period and the non-pulse period of the pulse signal light 10.

Figure 3:
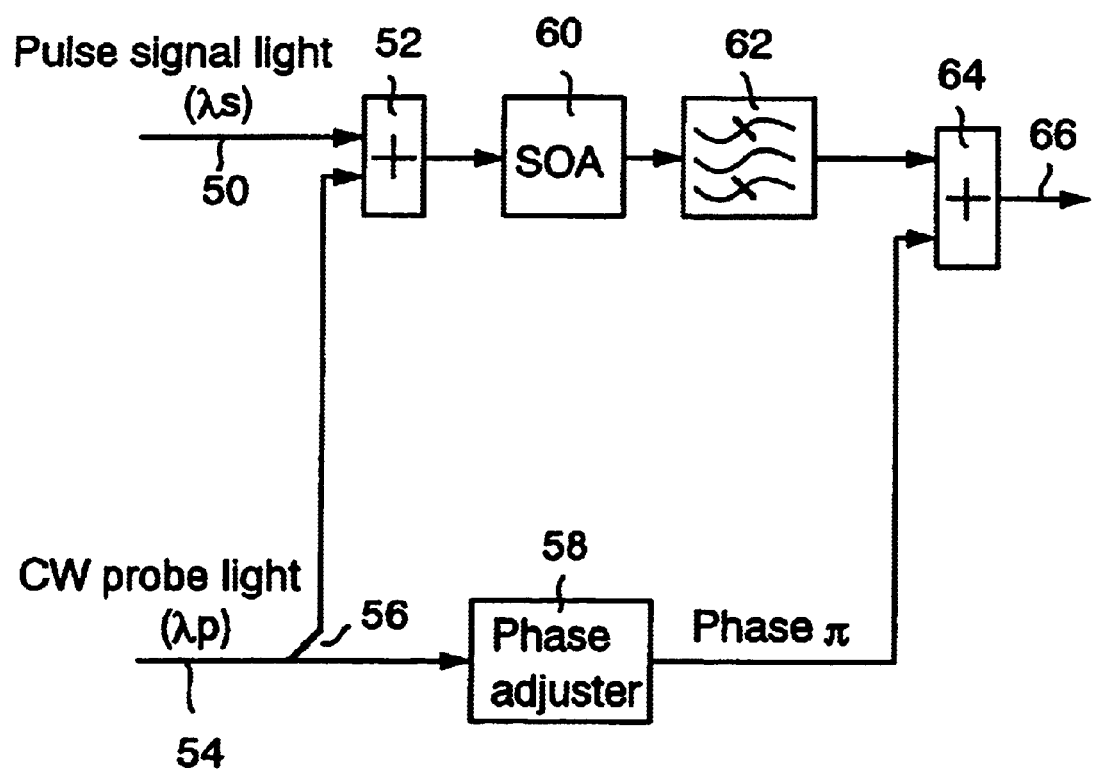
FIG. 3 is a schematic block diagram of a conventional configuration.
Figure 4:
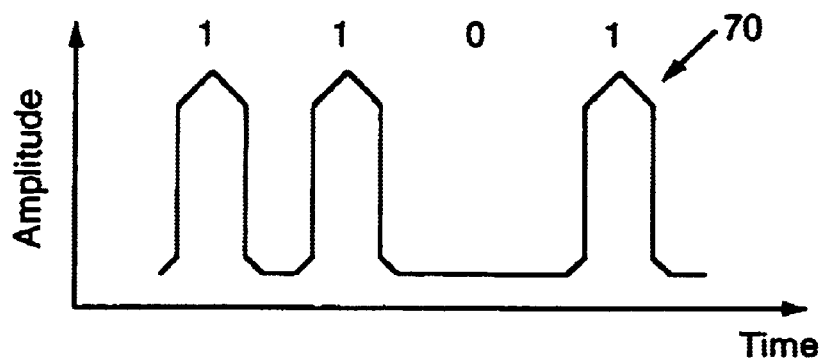
FIG. 4 shows waveform examples of the conventional configuration shown in FIG. 3.
Figure 4:
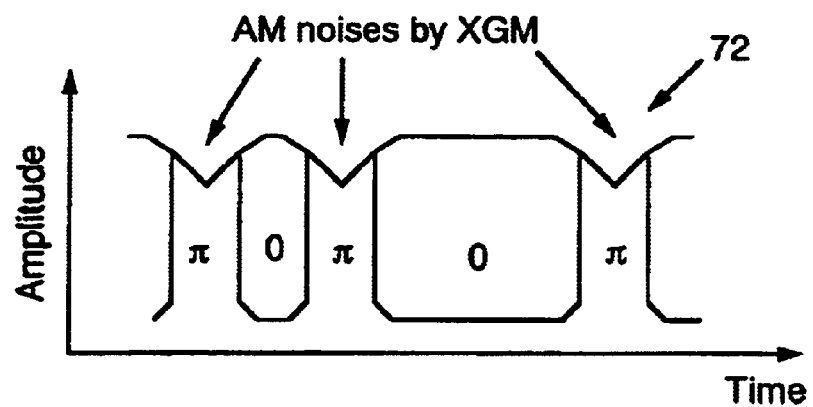
Figure 4:
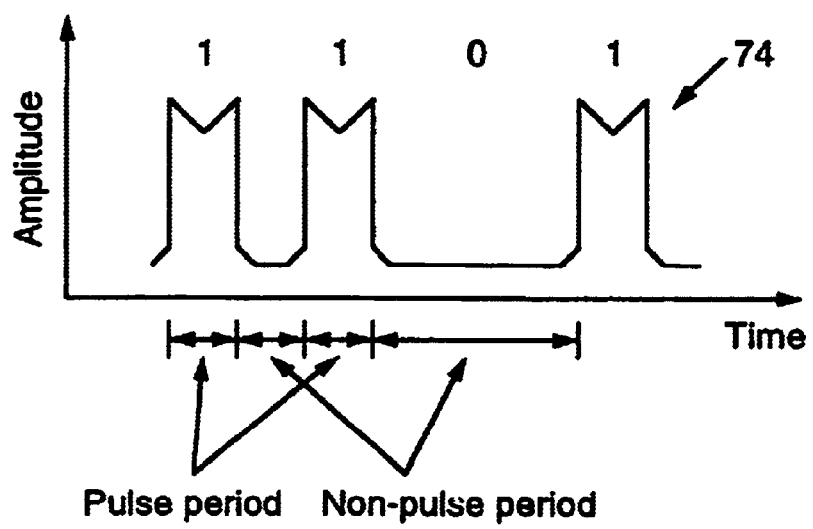

An optical bandpass filter (OBPF) 22 passes through exclusively the probe wavelength λp, namely the PM modulated light, out of the output light from the SOA 20. A waveform 42 in FIG. 2 shows amplitude and phase variations of the PM modulated light (probe wavelength λp) output from the optical bandpass filter 22. Caused by the XGM and pattern effect, AM noise is superposed on the amplitude of the CW probe light 14 in the SOA 20. Up to this point, the configuration is identical to that of the prior art shown in FIG. 3.

A splitter 24 splits the PM modulated light with the wavelength λp output from the optical bandpass filter 22 into two portions. One portion 24a of the split PM modulated lights enters a first input port of the combiner 28 and the other portion 24b enters a combiner 32.

The CW probe light split by the optical splitter 16 enters a second input port of the combiner 28 through the phase adjuster 18 and the attenuator 26. The phase adjuster 18 adjusts the optical phase of the CW probe light 14 from the splitter 16 so that the optical phase of the CW probe light entering the second input port of the combiner 28 becomes opposite to the optical phase of the PM modulated light 24a entering the first input port of the combiner 28, during the pulse period. The attenuator 26 adjusts the amplitude of the output light from the phase adjuster 18 so that the amplitude of the CW probe light entering the second input port of the combiner 28 becomes approximately equivalent to the amplitude of the PM modulated light 24a entering the first input port of the combiner 28. It is also applicable to dispose the attenuator 26 in front of the phase adjuster 18. Owing to the phase adjuster 18 and the attenuator 26, the phase modulated light 24a and CW probe light (output light from the attenuator 26) entering the combiner 28 have almost equal amplitude and also have identical optical phase during the non-pulse period of the phase modulated light 24a.

The combiner 28 combines the PM modulated light 24a (waveform 42) from the splitter 24 with the output light (CW probe light) from the attenuator 26. The input lights of the combiner 28 have opposite optical phase during the pulse period of the PM modulated light 24a (waveform 42) and have equal optical phase during the non-pulse period of the PM modulated light 24a (waveform 42), and furthermore, they have approximately equal amplitude. Therefore, as illustrated for a waveform 44 in FIG. 2, the output light from the combiner 28 has an optical pulse waveform in which no optical pulse exists during the pulse period and an optical pulse exists during the non-pulse period, which is opposite to the waveform of the pulse signal light 10. As shown in the waveform 44, AM noise having phase opposite to that of the AM noise of the PM modulated lights 24a and 24b (waveform 42) is superposed during the pulse period and AM noise having phase identical to that of the AM noise of the PM modulated lights 24a and 24b (waveform 42) is superposed during the non-pulse period.

The output light from the combiner 28 enters the other input of the combiner 32 through an attenuator 30. The attenuator 30 attenuates the output light from the combiner 28 so that the amplitude during the non-pulse period of the output light from the attenuator 30 becomes approximately equivalent to the amplitude during the non-pulse period of the PM modulated light 24b entered the combiner 32 from the combiner 24. The reason this operation is performed is that during the non-pulse period, the amplitude of the output light from the combiner 28 becomes larger by approximately 3 dB than the amplitude of the PM modulated light 24b because of the interference in the combiner 28.

The combiner 32 combines the PM modulated light 24b (waveform 42) with the output light (waveform 44) from the attenuator 30 in negative-phase, namely with an optical phase difference it. That is, the PM modulated light 24b (waveform 42) and the output light (waveform 44) from the attenuator 30 are added in in-phase during the pulse period and the PM modulated light 24b (waveform 42) and the output light (waveform 44) from the attenuator 30 are added in negative-phase during the non-pulse period. By this operation, the light during the non-pulse period disappears because of the interference. The output light 34 from the combiner 32 has a waveform practically identical to the waveform of the pulse signal light 10 in which an optical pulse exists during the pulse period and only noise light exists during the non-pulse period.

Regarding the AM noise component, the combiner 28 extracts the AM noise component and the combiner 32 adds the extracted AM noise component to the PM modulated light in negative-phase. Specifically, the optical phase of the AM noise components in the PM modulated light 24b (waveform 42) and the output light (waveform 44) from the attenuator 30 are reversed. Accordingly, the combiner 30 functions to suppress the AM noise superposed on the PM modulated light 24b (waveform 42). As schematically illustrated by a waveform 46 in FIG. 2, a pulse signal light 34 with the prove wavelength $\lambda p$ is obtained in which the AM noise caused by the SOA 20 is greatly suppressed.

It is possible to omit the attenuators 26 and 30 depending on the branching ratio of the splitters 16 and 24 and the combining ratio of the combiners 28 and 32. As described above, it is possible to dispose a delay element on an appropriate location for timing adjustment depending on the condition of delays by the devices 12, and 16–32.

Although the embodiment described above is an example in which the probe light 14 is a CW light, the SOA 20 functions as a logic operation device for binary-operating between the probe light 14 and the pulse signal light 10 when the probe light 14 is a pulse signal synchronizing with the input pulse signal light 10. For instance, the embodiment shown in FIG. 1 also functions as an optical gate or optical switch.

As readily understandable from the aforementioned explanation, according to the invention, AM noise caused by XGM and pattern effect in an optical interaction device can be effectively suppressed.

While the invention has been described with reference to the specific embodiment, it will be apparent to those skilled in the art that various variations and modifications can be made to the specific embodiment without departing from the spirit and scope of the invention as defined in the claims.

What is claimed is:

1. An optical signal processor comprising:
    a first input terminal for a pulse signal light with a signal wavelength;
    a second input terminal for a probe light with a wavelength different from the pulse signal wavelength;
    a first splitter to split the probe light into a first probe light portion and a second probe light portion;
    an XPM optical device, to which the first probe light portion from the first splitter and the pulse signal light enter, to modulate the first probe light portion from the first splitter according to amplitude variation of the pulse signal light and generate a phase-modulated output light;
    a second splitter to split the phase-modulated output light from the XPM optical device into a first phase-modulated portion and a second phase-modulated portion;
    a first combiner to combine the second probe light portion from the first splitter with the first phase-modulated portion from the second splitter in in-phase relation during a period corresponding to a non-pulse period of the pulse signal light; and
    a second combiner to combine the second phase-modulated portion from the second splitter with an output light from the first combiner in in-phase relation during a period corresponding to a pulse period of the pulse signal light.

2. The optical signal processor of claim 1 wherein the probe light comprises a continuous wave light.

3. The optical signal processor of claim 1 further comprising a first attenuator disposed between the first splitter and the first combiner for attenuating the second probe light portion from the first splitter.

4. The optical signal processor of claim 1 further comprising a phase adjuster disposed between the first splitter and the first combiner for adjusting a phase of the second probe light portion from the first splitter.

5. The optical signal processor of claim 1 further comprising bandpass filter disposed between the XPM optical device and the first combiner for filtering the output from the XPM optical device.

6. The optical signal processor of claim 1 further comprising a second attenuator disposed between the first combiner and the second combiner for attenuating the output from the first combiner.

7. An optical signal processing method comprising steps of:
    inputting a pulse signal light with a signal wavelength;
    inputting a probe light with a wavelength different from the pulse signal wavelength;
    splitting the probe light into two portions to generate a first and a second probe light components;
    modulating optical phase of the first probe light component using an XPM device according to amplitude variation of the pulse signal light;
    splitting a phase-modulated first probe light component output of the XPM device into two portions to generate a first and a second phase-modulated lights;
    combining the first phase-modulated light with the second probe light component at practically approximately equivalent amplitude in in-phase relation during a period corresponding to a non-pulse period of the pulse signal light; and
    combining the second phase-modulated light with the combined lights of the first phase-modulated light and the second probe light component in in-phase relation during a period corresponding to a pulse period of the pulse signal light.

8. The method of claim 7 wherein the probe light comprises a continuous wave light.

9. An optical switch comprising:
a first input terminal for inputting a pulse signal light with a signal wavelength;
a second input terminal for inputting a probe light with a wavelength different from the signal wavelength;
a first splitter for splitting the probe light into a first probe light portion and a second probe light portion;
an XPM optical device for modulating the first probe light portion from the first splitter according to amplitude variation of the pulse signal light;
a second splitter for splitting an output of the XPM optical device into a first phase-modulated portion and a second phase-modulated portion;
a first combiner for combining the second probe light portion with the first phase-modulated portion in in-phase relation during a period corresponding to a non-pulse period of the pulse signal light; and
a second combiner for combining the second phase-modulated portion with an output light from the first combiner in in-phase relation during a period corresponding to a pulse period of the pulse signal light.

10. The optical switch of claim 9 further comprising a first attenuator disposed between the first splitter and the first combiner for attenuating the second probe light portion from the first splitter.

11. The optical switch of claim 9 further comprising a phase adjuster disposed between the first splitter and the first combiner for adjusting a phase of the second probe light portion from the first splitter.

12. The optical switch of claim 9 further comprising bandpass filter disposed between the XPM optical device and the first combiner for filtering an output from the XPM optical device.

13. The optical switch of claim 9 further comprising a second attenuator disposed between the first combiner and the second combiner for attenuating the output from the first combiner.

* * * * *

UNITED STATES PATENT AND TRADEMARK OFFICE
CERTIFICATE OF CORRECTION

PATENT NO. : 6,847,475 B2  
DATED : January 25, 2005  
INVENTOR(S) : Hayashi et al.

Page 1 of 1

It is certified that error appears in the above-identified patent and that said Letters Patent is hereby corrected as shown below:

Title page,
Item [57], ABSTRACT,
Line 3, delete "with," insert -- with --.

Column 6,
Line 57, delete "practically".

Signed and Sealed this

Fifteenth Day of November, 2005

JON W. DUDAS
*Director of the United States Patent and Trademark Office*